(12) United States Patent
Hu et al.

(10) Patent No.: US 9,951,614 B2
(45) Date of Patent: Apr. 24, 2018

(54) BEHIND PIPE EVALUATION USING A NUCLEAR DENSITY TOOL

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/111,634

(22) PCT Filed: May 19, 2015

(86) PCT No.: PCT/US2015/031594
§ 371 (c)(1),
(2) Date: Jul. 14, 2016

(87) PCT Pub. No.: WO2016/186659
PCT Pub. Date: Nov. 24, 2016

(65) Prior Publication Data
US 2017/0145821 A1    May 25, 2017

(51) Int. Cl.
*E21B 49/08* (2006.01)
*G01V 5/12* (2006.01)
(Continued)

(52) U.S. Cl.
CPC .............. *E21B 49/08* (2013.01); *G01V 5/125* (2013.01); *E21B 29/00* (2013.01); *E21B 33/13* (2013.01)

(58) Field of Classification Search
CPC .......... E21B 49/08; E21B 29/00; E21B 33/13; G01V 5/125
See application file for complete search history.

(56) References Cited

U.S. PATENT DOCUMENTS 3,538,330 A * 11/1970 Youmans ................ G01V 5/101
166/187
4,439,678 A * 3/1984 Martin ................ E21B 47/1015
250/260

(Continued)

OTHER PUBLICATIONS

International Search Report and Written Opinion for PCT/US2015/031594 dated Feb. 4, 2016.

*Primary Examiner* — Christine Sung
(74) *Attorney, Agent, or Firm* — McDermott Will & Emery LLP

(57) ABSTRACT

In relation to a cut and pull operation, a nuclear tool may be used for evaluating the composition of materials located behind a pipe lining the wellbore. More specifically, a downhole method may include emitting gamma rays into the pipe and the material from a source of a nuclear tool disposed in the wellbore; detecting gamma radiation scattered back from the pipe and the material with a detector of the nuclear tool; determining a high-energy range and a low-energy range for the gamma radiation; measuring count rates of the gamma radiation in the high-energy range ($CR_H$) and the low-energy range ($CR_L$); performing an analysis of (1) the $CR_H$ relative to (2) the $CR_L$; and determining a compositional equivalent for the material based on the analysis.

22 Claims, 8 Drawing Sheets

(51) Int. Cl.
*E21B 29/00* (2006.01)
*E21B 33/13* (2006.01)

(56) References Cited

U.S. PATENT DOCUMENTS

| | | | |
|---|---|---|---|
| 9,267,359 B2* | 2/2016 | Smaardyk | E21B 43/04 |
| 2004/0210393 A1 | 10/2004 | Ellis et al. | |
| 2008/0061225 A1 | 3/2008 | Orban et al. | |
| 2008/0083872 A1* | 4/2008 | Huiszoon | G01V 5/125 |
| | | | 250/269.3 |
| 2009/0225949 A1 | 9/2009 | Wraight et al. | |
| 2010/0017134 A1* | 1/2010 | Steinman | E21B 43/04 |
| | | | 702/8 |
| 2011/0253364 A1 | 10/2011 | Mosse et al. | |
| 2014/0374582 A1 | 12/2014 | Guo et al. | |
| 2017/0045639 A1* | 2/2017 | Zhou | G01V 5/102 |

\* cited by examiner

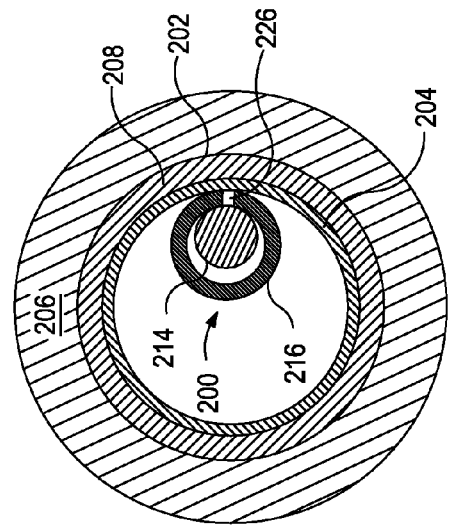
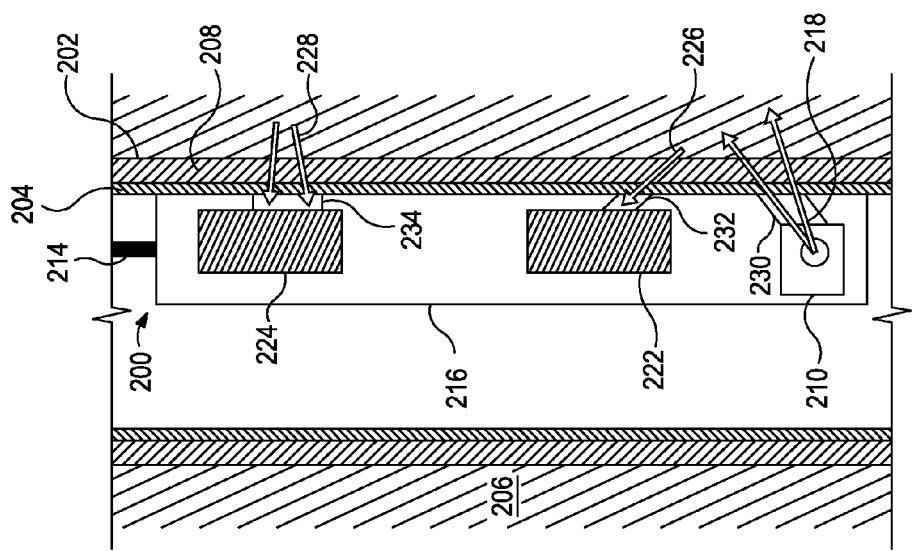

BEHIND PIPE EVALUATION USING A NUCLEAR DENSITY TOOL

BACKGROUND

The exemplary embodiments described herein relate to pipe removal operations.

When permanently closing an oil and gas well, often referred to as a "plug and abandon" operation, cement plugs are placed in several portions of the wellbore and surrounding formation. For example, an upper portion of a pipe (e.g., a casing) is removed from the wellbore and the wellbore is then cemented and capped. In this operation, often referred to as a "cut and pull" operation, the pipe is cut at a predetermined depth and pulled out of the wellbore.

Pipes are typically initially cemented into place after drilling the wellbore, so the pipe to be removed is preferable above the cement line so as to minimize the frictional forces encountered during the pulling portion of the operation.

The existing standard method to define the portion of the pipe that is not bonded to the cement is typically performed using a cement bond log and often in conjunction with an ultrasonic device. Using this method, the determination of the depth to cut and pull the pipe sometimes involves a trial and error process, which often leads to increased costs and time required to complete the plug and abandon operation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIGS. 2A-B illustrate side and top views of a nuclear tool disposed in a portion of a wellbore lined with a pipe and penetrating a subterranean formation.

(where $CR_F$ is the count rate for the far detector and $CR_N$ is the count rate for the near detector) of the high-energy range versus $$\ln \frac{CR_N}{CR_F}$$

of the low-energy count rates.

Figure 8:
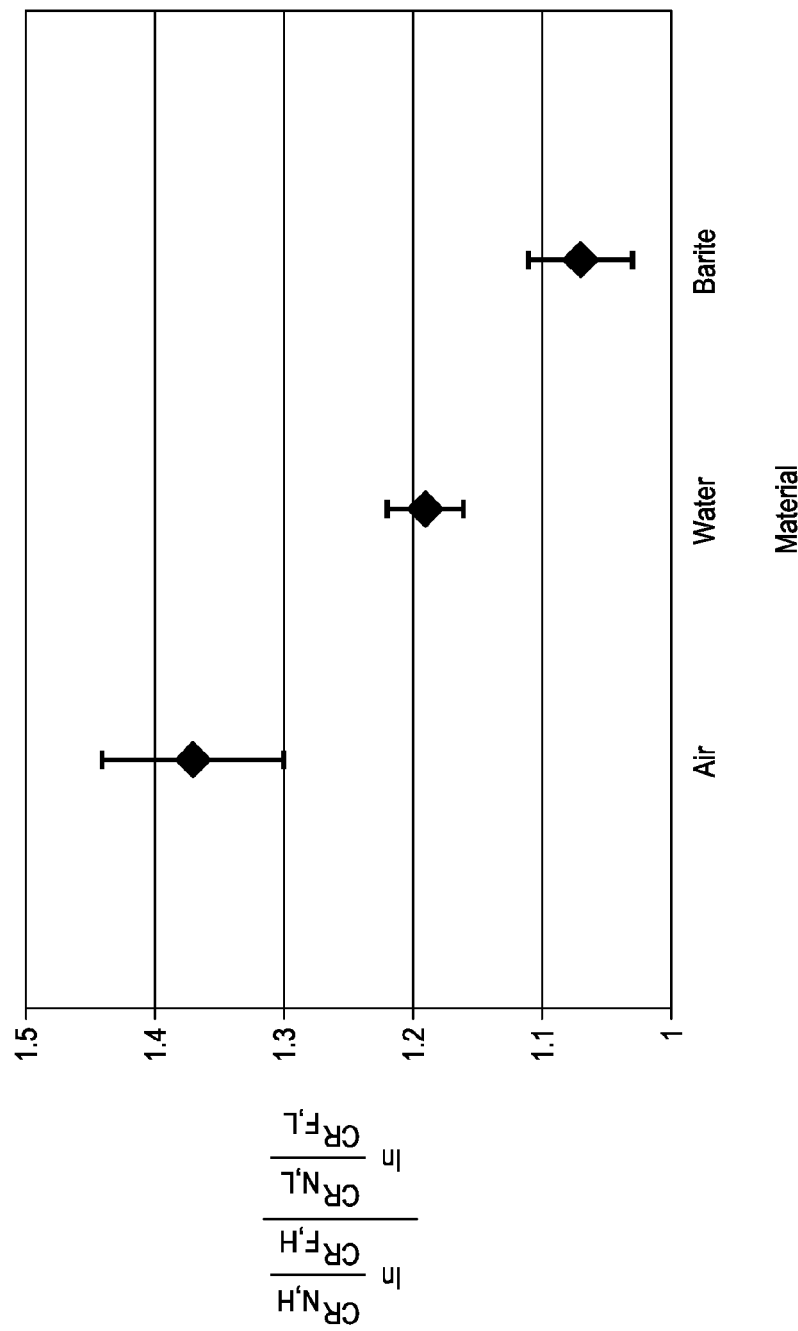

FIG. 8 illustrates a ratio according to Equation 1 for different compositional equivalents.

DETAILED DESCRIPTION

The present application relates to pipe removal operations and, more specifically, evaluating the materials behind the pipe based on their chemical composition and density using a nuclear tool. Such material evaluation may be useful in cut and pull operations.

Figure 1:
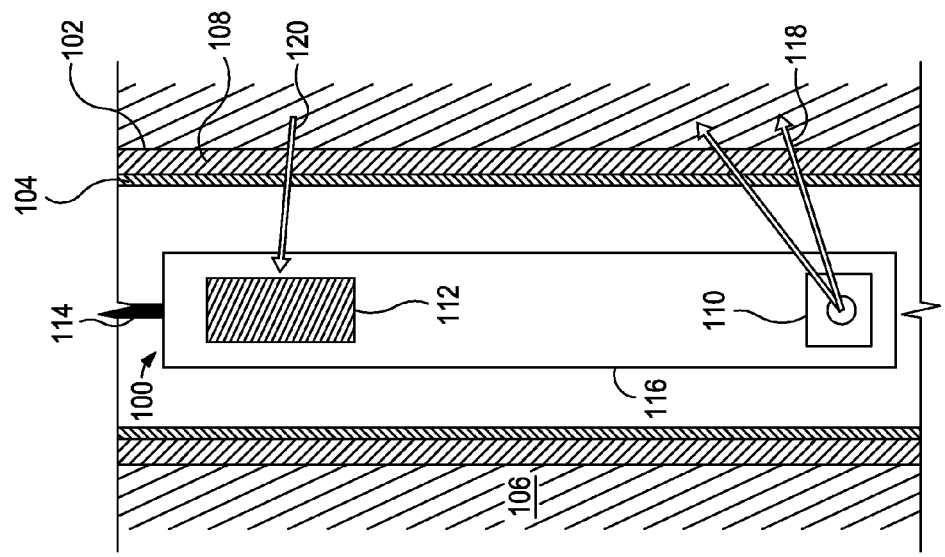
FIG. 1 illustrates side view of a nuclear tool disposed in a portion of a wellbore lined with a pipe and penetrating a subterranean formation.

FIG. 1 illustrates side view of a nuclear tool 100 disposed in a portion of a wellbore 102 lined with a pipe 104 (e.g., a casing) and penetrating a subterranean formation 106. Disposed between the pipe 104 and the wellbore 102 is a material 108 of unknown composition. While illustrated as a single pipe 104, in some instances, multiple pipes 104 may be lining the wellbore 102 with cement or the material 108 therebetween. As used therein, defining the material 108 of unknown composition to be disposed between the pipe 104 and the subterranean formation 106 does not mean that the pipe 104 and the subterranean formation 106 necessarily the boundaries that contain the material 108. Rather, the material 108 is radially, relative to the wellbore 102, located between the pipe 104 and the subterranean formation 106. For example, the material 108 may be contained by two pipes that themselves are disposed between the pipe 104 and the subterranean formation 106. In another example, the material 108 may be contained by the pipe 104 and a second pipe such that the second pipe is disposed between the pipe 104 and the subterranean formation 106.

The methods and systems described in more detail herein use the nuclear tool 100 to determine a compositional equivalent for the material 108. As used herein, the term "compositional equivalent" refers a category to which the material 108 can be assigned. Compositional equivalents include gas, liquid, mud, and cement and are described further herein.

The illustrated nuclear tool 100 includes a housing 116 that contains a source 110 and a detector 112. While the illustrated nuclear tool 100 includes one source 110 and one detector 112, in alternate embodiments, a nuclear tool may include more than one source and more than one detector.

The nuclear tool 100 is coupled to a conveyance 114 that may be used for moving the nuclear tool 100 along the wellbore 102, providing power to the nuclear tool 100, communicating information (e.g., data collected and operational commands), and the like, and any combination thereof. Exemplary conveyances may include, but are not limited to, a wireline, a coiled tubing, a slickline, a cable, drill pipe (e.g., as part of a logging-while-drilling or measuring-while-drilling tool), a downhole tractor, and the like.

The source 110 emits gamma rays 118 into the pipe 104, the material 108, and the formation 106. Gamma radiation 120 scattered back from the pipe 104, the material 108, and the formation 106 is detected by the detector 112. Detection of the gamma radiation 120 may be by way of measuring a count rate of photons as a function of energy.

FIGS. 2A-B illustrate side and top views of a nuclear tool 200 disposed in a portion of a wellbore 202 lined with a pipe 204 and penetrating a subterranean formation 206. The nuclear tool 200 is coupled to a conveyance 214. Disposed between the pipe 204 and the wellbore 202 is a material 208 of unknown composition. Similar to FIG. 1, in some instances, additional layers of pipe or cement may be between the material 208 of unknown composition and the subterranean formation 206.

The illustrated nuclear tool 200 includes a housing 216 that contains a source 210, a near detector 222, and a far detector 224 positioned sequentially along the length of the nuclear tool 200 such that the near detector 222 is between the source 210 and the far detector 224. As described above, the source 210 emits gamma rays 218 into the pipe 204, the material 208, and the formation 206. The near and far detectors 222,224 detect gamma radiation 226,228 scattered back from the pipe 204, the material 208, and the formation 206. Detection of the gamma radiation 226,228 may be by way of measuring a count rate of photons as a function of energy.

As illustrated, the source 210 and the near and far detectors 222,224 are each coupled to collimators 230,232, 234. The collimator 230 coupled to the source 210 directs the emitted gamma rays 218. The collimators 232,234 coupled to the near and far detectors 222,224 narrow the gamma radiation 226,228 being detected. Each of the collimators 230,232,234 are optional components of the nuclear tool 200.

The nuclear tool 200 of FIG. 2 is illustrated as engaging the pipe 204, while the nuclear tool 100 of FIG. 1 is illustrated as offset from the wellbore 102. Because the nuclear tool 100 is not engaged with the pipe 104, the emitted gamma rays 118 and gamma radiation 120 must traverse the fluid between the nuclear tool 102 and the pipe 104, which deplete the signal and increase the environmental dependence. Accordingly, in preferred embodiments, as illustrated in FIG. 2, the nuclear tool 200 may engage the pipe 204.

Methods described herein may utilize a nuclear tool (e.g., nuclear tool 100,200) with (1) a source for emitting gamma rays into a pipe and a material of unknown composition disposed between the pipe and a subterranean formation and (2) one or more detectors for detecting gamma radiation scattered back from the pipe and the material. The gamma radiation may then be analyzed as described further herein where the analysis is used for determining a compositional equivalent for the material of unknown composition.

Figure 3:
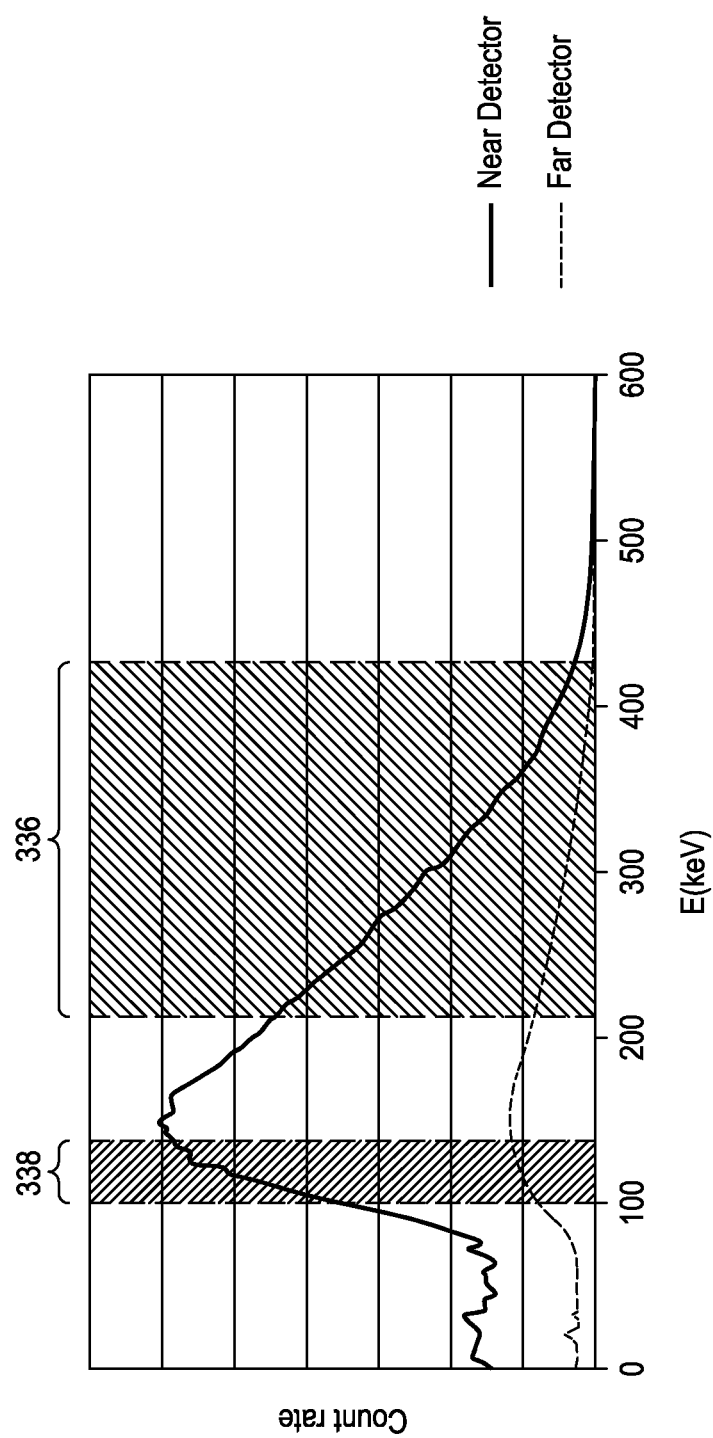
FIG. 3 illustrates a plot of the count rate as a function of energy for the gamma radiation detected by the near and far detectors.

FIG. 3, with continued reference to FIGS. 2A-2B, illustrates a plot of the measured count rate as a function of energy for the gamma radiation 226,228 detected by the near and far detectors 222,224, respectively. Two energy ranges (a high-energy range 336 and a low-energy range 338) of the gamma radiation 226,228 (or the gamma radiation 120 of FIG. 1) are analyzed to determine a compositional equivalent for the material 208 (or the material 108 of FIG. 1) having an unknown composition, as described further herein. More specifically, methods described herein may involve measuring the count rates of the gamma radiation 226,228 (or the gamma radiation 120 of FIG. 1) in the high and low-energy ranges 336,338 and performing an analysis of the count rates as described further herein.

The high and low-energy ranges 336,338 are illustrated at 100 keV (kilo electron volt) to 150 keV and 225 keV to 425 keV, respectively. The illustrated high and low-energy ranges 336,338 are not limiting. Methods and analyses described herein may involve determining the high and low-energy ranges 336,338. Generally, the low-energy range 338 is non-overlapping with and at a lower energy than the high-energy range 336. The high-energy range 336 may be adjusted (e.g., 100 keV to 500 keV and any subset thereof) so that the lower limit of the high-energy range is preferable at a higher energy than the peak energy of the spectra. The low-energy range 338 may be adjusted (e.g., 75 keV to 175 keV and any subset thereof) so that the upper limit of the low-energy range is preferable at a lower energy than the peak energy of the spectra.

The starting and ending values for each energy range 336,338 are tool type specific and can be determined using computer simulation or lab experiments. For example, when using a nuclear density tool as the nuclear tool 200, the low and high-energy windows can be one of the existing energy windows of the nuclear density tool. For example, when using the Halliburton LOGIQ density tool, the PEAK window can be the low-energy range 338, and the BARITE window can be the high-energy window 336.

The chemical composition and the bulk density of the material 208 (or the material 108 of FIG. 1) affect the photon interactions of the gamma radiation 226,228 (or the gamma radiation 120 of FIG. 1) in the high and low-energy ranges 336,338 differently. More specifically, the count rates of the gamma radiation 226,228 in the high-energy range 336 are mostly sensitive to the bulk density (ρ) of the materials that the gamma radiation 226,228 encountered. The count rates of the gamma radiation 226,228 in the low-energy range 338 are mostly sensitive to the chemical composition and, more specifically, the photoelectric absorption ability of the materials that the gamma radiation 226,228 encountered. The photoelectric absorption (Pe) can be described using the effective atomic number (z) according to:

$$Pe = \left(\frac{z}{10}\right)^{3.6},$$

where z is the atomic number.

Table 1 provides the ρ and Pe for some compositions that may be material 108,208. This illustrates that an analysis of the ρ and Pe can distinguish between various compositions. Therefore, an analysis of the count rates in the high and low-energy ranges 336,338, which relate to ρ and Pe, respectively, can be used to determine a compositional equivalent for the material 208 (or the material 108 of FIG. 1).

TABLE 1

| Material | ρ (g/mL) | Pe | Compositional Equivalent |
|---|---|---|---|
| water | 1.0 | 0.36 | liquid |
| barite | 4.5 | 266.8 | mud |
| air | 0.001 | 0.32 | gas |

Figure 4:
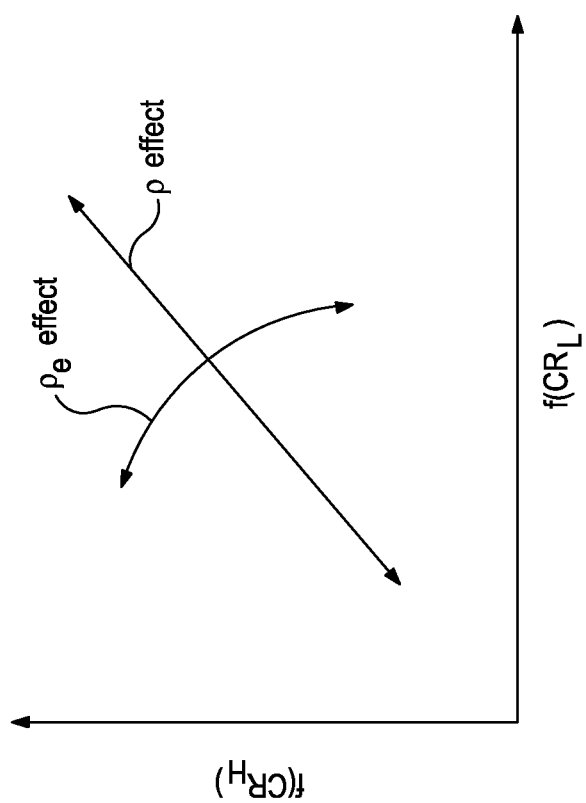
FIG. 4 illustrates the effect of material properties on the data in the cross plot of a mathematical extrapolation of the count rates (f(CR)) or for the high and low-energy ranges.

The chemical composition and the bulk density of the materials do not affect the photons in the high and low-energy ranges 336,338 equally, which can be analyzed with a cross plot, for example, to determine a compositional equivalent for the material 108,208. For example, FIG. 4 illustrates the effect of material properties on the data in the cross plot of the count rates (CR) or a mathematical extrapolation thereof (f(CR)) for the high and low-energy ranges 336,338. The bulk density effect causes data points to move diagonally within the plot. And the chemical composition of high effective atomic number causes data points to deviate from diagonal within the plot.

The count rates may be based off raw data or corrected data from the detectors 112,222,224. Corrected data may, for example, include corrections relating to the electronics, the crystals, or both in the detectors 112,222,224 that may influence the true count rates of the photons collected by the detector. One skilled in the art would recognize appropriate corrections and how to apply them to the raw data.

In some embodiments, determining a compositional equivalent of the material 108,208 of unknown composition may involve analyzing the count rates (or a mathematical extrapolation thereof) of the gamma radiation in the high and low-energy ranges 336,338 ($CR_H$ and $CR_L$, respectively). Exemplary analyses may be made for:

(1) $CR_H$ and $CR_L$, (2) $\dfrac{CR_{N,H}}{CR_{F,H}}$ and $\dfrac{CR_{N,L}}{CR_{F,L}}$, (3) $\log\dfrac{CR_{N,H}}{CR_{F,H}}$ and $\log\dfrac{CR_{N,L}}{CR_{F,L}}$, (4) $\ln\dfrac{CR_{N,H}}{CR_{F,H}}$ and $\ln\dfrac{CR_{N,L}}{CR_{F,L}}$, and any foregoing ratios with the numerator and the denominator swapped.

In some embodiments, the count rate analysis may be strictly numerical. For example, each compositional equivalent may have ranges for the each of the $CR_H$ and the $CR_L$ (or mathematical extrapolation thereof), which allows for the corresponding correlations.

In some embodiments, the count rate analysis may be a cross plot analysis involving cross plotting of the count rates in the high and low-energy ranges 336,338. Exemplary cross plot analysis may include: $CR_H$ vs $CR_L$, $\log CR_H$ vs $\log CR_L$, $\ln CR_H$ vs $\ln CR_L$, and the foregoing with the axes swapped. Such analysis may be suitable when implementing a nuclear tool with one or more detector where the cross plot analysis is for a single detector. Example 1 below illustrates a $CR_H$ vs $CR_L$ cross plot analysis. When two detectors are used (e.g., as discussed relative to FIGS. 2A-2B), the count rates for the near (N) and far (F) detectors may be analyzed. Exemplary cross plot analysis may include:

$\dfrac{CR_{N,H}}{CR_{F,H}}$ vs $\dfrac{CR_{N,L}}{CR_{F,L}}$, $\log\dfrac{CR_{N,H}}{CR_{F,H}}$ vs $\log\dfrac{CR_{N,L}}{CR_{F,L}}$, $\ln\dfrac{CR_{N,H}}{CR_{F,H}}$ vs $\ln\dfrac{CR_{N,L}}{CR_{F,L}}$, and the foregoing with the axes swapped. Example 2 below illustrates a $\ln\dfrac{CR_{N,H}}{CR_{F,H}}$ vs $\ln\dfrac{CR_{N,L}}{CR_{F,L}}$ cross plot analysis.

In some instances, zones of the cross plot may be assigned to specific compositional equivalents. Then, when the measurements and analyses are performed, the location of the measured data within a zone on the cross plot may designate the material 108,208 to be of the corresponding compositional equivalent.

Alternatively, the measurements with the nuclear tool may, in some embodiments, be performed at several locations along the wellbore. Then, the data for the various locations may be cross plotted and analyzed. The analysis may show linear relationships and/or deviation from the linear relationships that can then be attributed to compositional changes and used to identify compositional equivalents for the material 108,208 at the various locations analyzed.

In some embodiments, the count rate analysis may be a ratio analysis that involves calculating and analyzing a ratio of the count rates in the high and low-energy ranges 336,338. Exemplary ratio analyses may include calculating:

$\dfrac{CR_H}{CR_L}, \dfrac{\log CR_H}{\log CR_L}, \dfrac{\ln CR_H}{\ln CR_L}, \dfrac{\frac{CR_{N,H}}{CR_{F,H}}}{\frac{CR_{N,L}}{CR_{F,L}}}, \dfrac{\log\frac{CR_{N,H}}{CR_{F,H}}}{\log\frac{CR_{N,L}}{CR_{F,L}}}, \dfrac{\ln\frac{CR_{N,H}}{CR_{F,H}}}{\ln\frac{CR_{N,L}}{CR_{F,L}}},$ and the foregoing with the numerator and denominator swapped. Example 3 below illustrates a $\dfrac{\ln\frac{CR_{N,H}}{CR_{F,H}}}{\ln\frac{CR_{N,L}}{CR_{F,L}}}$ ratio analysis. Analysis of the ratio may, in some instances, involve correlating the ratio to a compositional equivalent. For example, each compositional equivalent may have a range for the ratio associated therewith that can be used for correlating the ratio to the compositional equivalent.

In some instances, the measurements with the nuclear tool may, in some embodiments, be performed at several locations along the wellbore. The ratios at each of the locations may be analyzed as described above (e.g., correlating each ratio to ranges for the associated with each compositional equivalent). Alternatively, the ratio at the various locations may be analyzed relative to each other (e.g., a plot of depth versus the ratio). Changes to the ratio can then be attributed to compositional changes and used to identify compositional equivalents for the material 108,208 at the various locations analyzed. Accordingly, methods and analyses described herein may include comparing the analyses of the high and low-energy ranges 336,338 at each of the plurality of locations to each other, which may then be used for identifying the compositional equivalent for the material 108,208 at the plurality of locations and/or identifying portions of the wellbore corresponding to one or more of the compositional equivalents.

The methods and analyses described herein may use one or more cross plot analyses, one or more ratio analyses, or a combination thereof determining a compositional equivalent for the material(s) 108,208 being analyzed. As described above, compositional equivalents are categories of compositions that the material 108,208 may be similar to. Compositional equivalents may include, but are not limited to, gas, liquid, mud, and cement. For example, if an analysis described herein may indicate that the material 108,208 is a mud. The material 108,208 may be a settled drilling mud that is weighted with barite. Alternatively, the material 108,208 may be a settled drilling mud that is weighted with hematite, calcium carbonate, ilmenite, sand, or another weighting agent. That is, the compositional equivalent does not provide for a distinct or exact composition of the material 108,208, but rather a general type of composition that the material 108,208 may be. Examples of materials 108,208 categorized as gas compositional equivalents may include, but are not limited to, air, natural gas, and the like. Examples of materials 108,208 categorized as liquid compositional equivalents may include, but are not limited to, water, brines, emulsions, oil, alkanes, olefins, aromatic organic compounds, cyclic alkanes, paraffins, diesel fluids, mineral oils, desulfurized hydrogenated kerosenes, and the like.

Identifying the compositional equivalent of the material 108,208 may allow engineers to determine where to cut the pipe 104,204 for a cut and pull operation that minimizes the friction during pulling. The cutting depth is preferably as close to the top of cement as possible so that the maximum length of the pipe 104,204 can be recovered while minimizing frictional forces caused by cement-pipe interactions. Generally, at the top of cement there are layers of cement, settled weighting agent from the drilling fluid (the compositional equivalent described herein is mud), liquid, and gas. Accordingly, the analyses and methods described herein for analyzing the material 108,208 of unknown composition may provide for a better estimation of the cutting depth to enhance the efficacy and efficiency of cut and pull operations.

Figure 5:
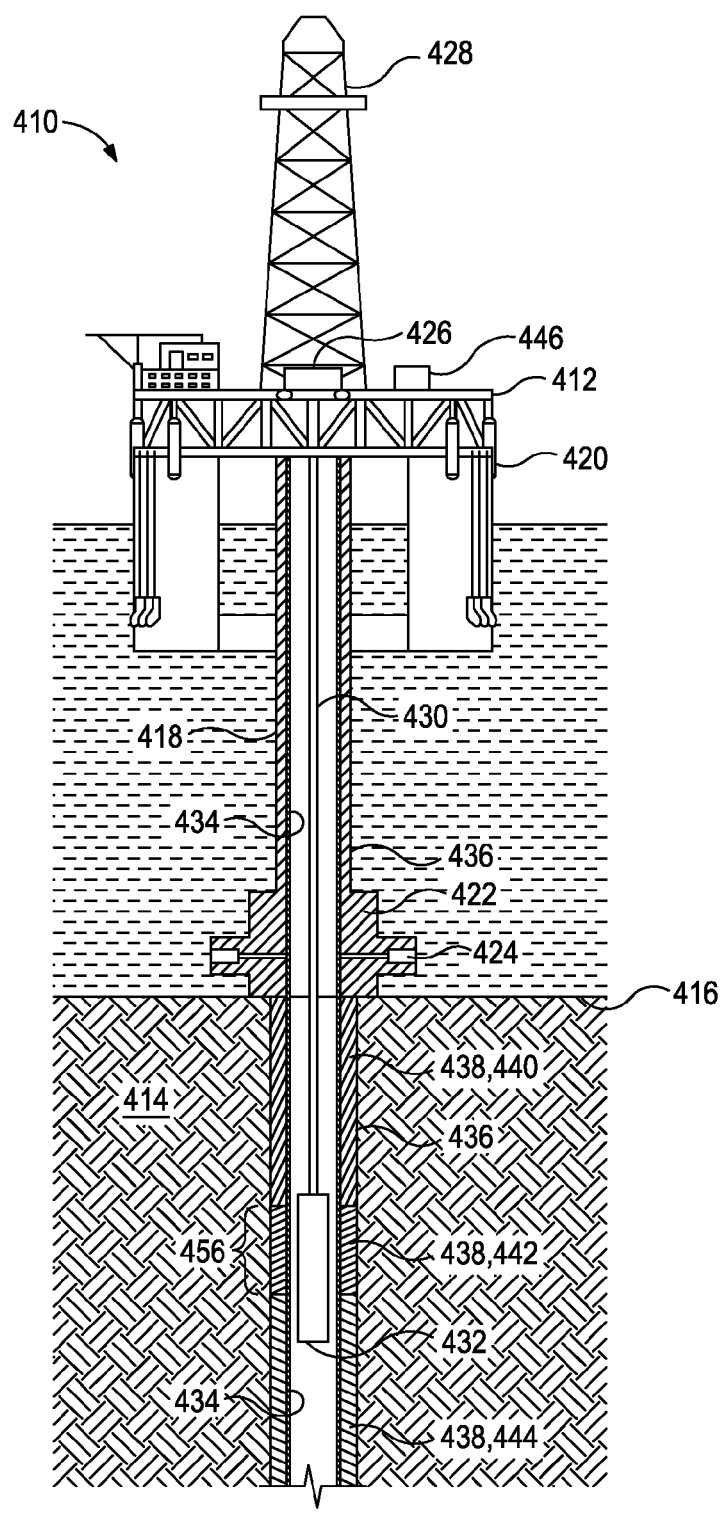
FIG. 5 provides an exemplary illustration of a system suitable for performing the analyses and methods described herein, according to at least some embodiments.

FIG. 5 provides an exemplary illustration of a system 410 suitable for performing the analyses and methods described herein, according to at least some embodiments. While this example is illustrated as an offshore system 410, those skilled in the art will recognize the applicability and corresponding modification for onshore systems, without departing from the scope of the disclosure.

As illustrated, a semi-submersible platform 412 is centered over a submerged oil and gas formation 414 located below sea floor 416. A subsea conduit 418 extends from a deck 420 of the platform 412 to a wellhead installation 422 including subsea blow-out preventers 424. The platform 412 has a hoisting apparatus 426 and a derrick 428 for conveying a nuclear tool 432 coupled to a conveyance 430 through a wellbore 436 penetrating the subterranean formation 414. Although depicted as a wireline, conveyance 430 may be any of the exemplary conveyances listed above.

A material 438 of unknown composition to an operator is disposed between the pipe 434 and the wellbore 436. As illustrated, the material 438 transitions from a gas or liquid 440 to settled weighting agent 442 (or mud) to cement 444. The nuclear tool 432 may be used to analyze the material 438 along a length or portion of the wellbore 436 in order to identify a compositional equivalent for the material 438 behind the pipe 434. Then, a cutting zone 456 may be determined. The cutting zone 456 is preferable where the material 438 has a compositional equivalent of mud 442. Then, the pipe 434 may be within the cutting zone 456 and pulled to the platform 412 (or the surface for a land-based system).

In addition to the methods and systems described herein being useful for determining a cutting zone 456, the analysis of the material 438 behind the pipe 434 may be useful in estimating the weight of the portion of the pipe 434 that is pulled to the surface. This may advantageously assist operators in planning for the uphole equipment (e.g., the hoisting apparatus 426) needed to pull the cut portion of the pipe 434 to the platform 412.

The illustrated system 410 further includes a control system 446 that may, inter alia, perform the analyses and methods described herein. For example, the control system 446 may be configured to receive information (e.g., via input from an operator or via the conveyance 430 from the nuclear tool 432) regarding the count rates of the gamma radiation measured by the near and far detectors, the position of the nuclear tool 432 along the length of the wellbore 436, and the like. The control system 446 may also be configured to transmit information to the nuclear tool 432 (e.g., via the conveyance 430 such as a wireline) regarding when to take measurements, to the hoisting apparatus 426 regarding placement of the nuclear tool 432 at a desired position along the length of the wellbore 436, and the like.

The control system 446 may store the set of instructions and corresponding algorithms for executing the methods and analyses described herein. For example, the control system may be configured to apply necessary correction to the count rates as previously described. Further, the control system may be configured to display the results to an operator. For example, one or more of the count rates and its mathematical extrapolation described herein may be displayed. In another example, one or more of the cross plots described herein may be displayed. In another example, the depth at which the material 438 is weighting agent 442 may be displayed. Combinations of the foregoing may also be displayed.

In some instances, the control system 446 may be more than one control system where, for example, at least one of the functions described herein are performed on a control system that communicates with the additional control systems to achieve the results descried herein relative to the control system 446. For example, at least a portion of the control system 446 can be wholly or at least partially disposed within the nuclear tool 432.

For example, in some instances, a first portion of the control system(s) 446 disposed within the nuclear tool 432 may be designed, arranged, or configured to operate the nuclear tool 432 (e.g., emitting the gamma rays and detecting the gamma radiation) and store the count rates of the gamma radiation, while a second portion of the control system(s) 446 not disposed within the nuclear tool 432 may be designed, arranged, or configured to determine the high and low-energy ranges and perform an analysis of the count rates in the high and low-energy ranges. The determination of a compositional equivalent for the material(s) analyzed may be done with the second portion of the control system(s) 446 or by an operator.

In another example, a first portion of the control system(s) 446 disposed within the nuclear tool 432 may be designed, arranged, or configured to communicate via the conveyance 430 (such as a wireline) and operate the nuclear tool 432 as communicated by the operator or a second portion of the control system(s) 446, and transmit the count rates of the gamma radiation detected by the nuclear tool 432 via the conveyance 430 to the second portion of the control system(s) 446 or a third portion of the control system(s) 446. Then, the second or third portion of the control system(s) 446 that received the count rates of the gamma radiation detected may be designed, arranged, or configured to determine the high and low-energy ranges, perform an analysis of the count rates in the high and low-energy ranges, and determination of a compositional equivalent for the material(s) analyzed.

In yet another nonlimiting example, a control system 446 may be wholly disposed in the nuclear tool 432 for operating the nuclear tool and perform an analysis of the count rates in the high and low-energy ranges. In such an example, the control system 446 may determine the high and low-energy ranges or the high and low-energy ranges may be input to the control system 446. Further, the determination of a compositional equivalent for the material(s) analyzed may be performed by the control system 446, or an operator may review the analysis of the count rates in the high and low-energy ranges performed by the control system 446 for determining a compositional equivalent for the material(s) analyzed.

The control system(s) 446 and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include Embodiment A, Embodiment B, and Embodiment C.

Embodiment A is a method that includes providing a wellbore penetrating a subterranean formation and lined with a pipe (e.g., a casing), wherein a material having an unknown composition is disposed between the pipe and the subterranean formation; and analyzing the material by: emitting gamma rays into the pipe and the material from a source of a nuclear tool disposed in the wellbore; detecting gamma radiation scattered back from the pipe and the material with a detector of the nuclear tool; determining a high-energy range and a low-energy range for the gamma radiation; measuring count rates of the gamma radiation in the high-energy range ($CR_H$) and the low-energy range ($CR_L$); performing an analysis of (1) the $CR_H$ relative to (2) the $CR_L$; and determining a compositional equivalent for the material based on the analysis.

Embodiment A may have one or more of the following additional elements in any combination: Element A1: wherein performing the analysis involves: cross plotting $CR_H$ versus $CR_L$ or vice versa; Element A2: wherein performing the analysis involves: calculating a $$\frac{CR_H}{CR_L},$$

a $$\frac{CR_L}{CR_H},$$

or both and correlating the $$\frac{CR_H}{CR_L},$$

the $$\frac{CR_L}{CR_H},$$

or the both to the compositional equivalent for the material; Element A3: wherein the gamma radiation is a first gamma radiation, the gamma detector is a near gamma detector, the $CR_H$ is $CR_{N,H}$, and $CR_L$ is $CR_{N,L}$, and wherein analyzing the material further includes: detecting second gamma radiation scattered back from the pipe and the material with a far detector of the nuclear tool, wherein the source, the near detector, and the far detector are positioned sequentially along a length of the nuclear tool such that the near detector is between the source and the far detector; determining a high-energy range and a low-energy range for the second gamma radiation; measuring count rates of the second gamma radiation in the high-energy range ($CR_{F,H}$) and the low-energy range ($CR_{F,L}$); wherein the analysis is of (1) the $CR_{N,H}$ and the $CR_{F,H}$ relative to (2) the $CR_{N,L}$ and the $CR_{F,L}$; and determining a compositional equivalent for the material based on the analysis; Element A4: Element A3 and wherein performing the analysis involves: cross plotting $$\frac{CR_{N,H}}{CR_{F,H}}$$

versus $$\frac{CR_{N,L}}{CR_{F,L}}$$

or vice versa; Element A5: Element A3 and wherein performing the analysis involves: calculating a $$\frac{CR_{N,H}}{CR_{F,H}}$$

and a $$\frac{CR_{N,L}}{CR_{F,L}}$$

and correlating the $$\frac{CR_{N,H}}{CR_{F,H}}$$

and the $$\frac{CR_{N,L}}{CR_{F,L}}$$

to the compositional equivalent for the material; Element A6: Element A3 and wherein performing the analysis involves: calculating a $$\frac{CR_{N,H}}{CR_{F,H}}$$

and a $$\frac{CR_{N,L}}{CR_{F,L}}$$

and correlating a $$\frac{\frac{CR_{N,H}}{CR_{F,H}}}{\frac{CR_{N,L}}{CR_{F,L}}}$$

or a $$\frac{\frac{CR_{N,L}}{CR_{F,L}}}{\frac{CR_{N,H}}{CR_{F,H}}}$$

to the compositional equivalent for the material; Element A7: Element A3 and wherein performing the analysis involves: cross plotting $$\ln\frac{CR_{N,H}}{CR_{F,H}}$$

versus $$\ln\frac{CR_{N,L}}{CR_{F,L}}$$

or vice versa; Element A8: Element A3 and wherein performing the analysis involves: calculating a $$\ln\frac{CR_{N,H}}{CR_{F,H}}$$

and a $$\ln\frac{CR_{N,L}}{CR_{F,L}}$$

and correlating the $$\ln\frac{CR_{N,H}}{CR_{F,H}}$$

and the $$\ln\frac{CR_{N,L}}{CR_{F,L}}$$

to the compositional equivalent for the material; Element A9: Element A3 and wherein performing the analysis involves: calculating a $$\ln\frac{CR_{N,H}}{CR_{F,H}}$$

and a $$\ln\frac{CR_{N,L}}{CR_{F,L}}$$

and correlating a $$\frac{\ln\frac{CR_{N,H}}{CR_{F,H}}}{\ln\frac{CR_{N,L}}{CR_{F,L}}}$$

or a $$\frac{\ln\frac{CR_{N,L}}{CR_{F,L}}}{\ln\frac{CR_{N,H}}{CR_{F,H}}}$$

to the compositional equivalent for the material; Element A10: the method further including moving the nuclear tool along the wellbore to a plurality of locations; and performing the analysis for the plurality of locations; Element A11: the method with Element A10 further including comparing the analysis corresponding to each of the plurality of locations; Element A12: the method with Element A10 further including identifying a portion of the wellbore in which the compositional equivalent of the material is a gas based on the analysis for the plurality of locations; Element A13: the method with Element A10 further including identifying a portion of the wellbore in which the compositional equivalent of the material is a liquid based on the analysis for the plurality of locations; Element A14: the method with Element A10 further including identifying a portion of the wellbore in which the compositional equivalent of the material is a mud based on the analysis for the plurality of locations; Element A15: the method with Elements A10 and A14 further including determining a cutting zone along the pipe for performing a cut and pull operation based the portion of the wellbore in which the compositional equivalent of the material is the mud; Element A16: the method with Element A10 and A14 further including cutting the pipe at the portion of the wellbore in which the compositional equivalent of the material is the mud, thereby producing a cut portion of the pipe; and pulling the cut portion of the pipe out of the wellbore; Element A17: wherein the pipe is a first pipe and a second pipe is disposed between the first pipe and the subterranean formation and the material is disposed between the second pipe and the subterranean formation; and Element A18: wherein the pipe is a first pipe and a second pipe is disposed between the first pipe and the subterranean formation and the material is disposed between the first and second pipes.

By way of non-limiting example, exemplary combinations applicable to Embodiment A include: Element A1 in combination with Element A2 and optionally in further combination with Element A10 and optionally one or more of Elements A11-A16; Element A1 in combination with Element A10 and optionally one or more of Elements A11-A16; Element A2 in combination with Element A10 and optionally one or more of Elements A11-A16; Element A3 in combination with two or more of Elements A4-A9 and optionally in further combination with Element A10 and optionally one or more of Elements A11-A16; one of Elements A3-A9 in combination with Element A10 and optionally one or more of Elements A11-A16; Elements A17 or A18 in combination with any of the foregoing; and Elements A17 or A18 in combination with one or more of Elements A1-A16.

Embodiment B is a method that includes providing a wellbore penetrating a subterranean formation and lined with a pipe, wherein a material having an unknown composition is disposed between the pipe and the subterranean formation; moving the nuclear tool along the wellbore to a plurality of locations, the nuclear tool having at least one source and at least two detectors; and analyzing the material at the plurality of locations by: emitting gamma rays into the pipe and the material from a first source of a nuclear tool disposed in the wellbore; detecting first gamma radiation scattered back from the pipe and the material with a near detector of the nuclear tool; detecting second gamma radiation scattered back from the pipe and the material with a far detector of the nuclear tool, wherein the first source, the near detector, and the far detector are positioned sequentially along a length of the nuclear tool such that the near detector is between the first source and the far detector; determining a high-energy range and a low-energy range for the first and second gamma radiation; measuring count rates of the first gamma radiation in the high-energy range ($CR_{N,H}$) and the low-energy range ($CR_{N,L}$) and count rates of the second gamma radiation in the high-energy range ($CR_{F,H}$) and the low-energy range ($CR_{F,L}$); performing an analysis of (1) the $CR_{N,H}$ and the $CR_{F,H}$ relative to (2) the $CR_{N,L}$ and the $CR_{F,L}$ at each of the plurality of locations based on analysis; and determining a compositional equivalent for the material for at least some of the locations based on analysis.

Embodiment B may have one or more of the following additional elements in any combination: Element B1: wherein performing B2: wherein performing the analysis involves: calculating a $$\frac{CR_{N,H}}{CR_{F,H}}$$

and a $$\frac{CR_{N,L}}{CR_{F,L}}$$

and correlating the $$\frac{CR_{N,H}}{CR_{F,H}}$$

and the $$\frac{CR_{N,L}}{CR_{F,L}}$$

to the compositional equivalent for the material; Element B3: wherein performing the analysis involves: calculating a $$\frac{CR_{N,H}}{CR_{F,H}}$$

and a $$\frac{CR_{N,L}}{CR_{F,L}}$$

and correlating a $$\frac{\frac{CR_{N,H}}{CR_{F,H}}}{\frac{CR_{N,L}}{CR_{F,L}}}$$

or a $$\frac{\frac{CR_{N,L}}{CR_{F,L}}}{\frac{CR_{N,H}}{CR_{F,H}}}$$

to the compositional equivalent for the material; Element B4: wherein performing the analysis involves: cross plotting $$\ln\frac{CR_{N,H}}{CR_{F,H}}$$

versus $$\ln\frac{CR_{N,L}}{CR_{F,L}}$$

or vice versa; Element B5: wherein performing the analysis involves: calculating a $$\ln\frac{CR_{N,H}}{CR_{F,H}}$$

and a $$\ln\frac{CR_{N,L}}{CR_{F,L}}$$

and correlating the $$\ln\frac{CR_{N,H}}{CR_{F,H}}$$

and the $$\ln\frac{CR_{N,L}}{CR_{F,L}}$$

to the compositional equivalent for the material; Element B6: wherein performing the analysis involves: calculating a $$\ln\frac{CR_{N,H}}{CR_{F,H}}$$

and a $$\ln\frac{CR_{N,L}}{CR_{F,L}}$$

and correlating a $$\frac{\ln\frac{CR_{N,H}}{CR_{F,H}}}{\ln\frac{CR_{N,L}}{CR_{F,L}}}$$

or a $$\frac{\ln\frac{CR_{N,L}}{CR_{F,L}}}{\ln\frac{CR_{N,H}}{CR_{F,H}}}$$

to the compositional equivalent for the material; Element B7: the method further including comparing the analysis corresponding to each of the plurality of locations; Element B8: the method further including identifying a portion of the wellbore in which the compositional equivalent of the material is a gas based on the analysis for the plurality of locations; Element B9: the method further including identifying a portion of the wellbore in which the compositional equivalent of the material is a liquid based on the analysis for the plurality of locations; Element B10: the method further including identifying a portion of the wellbore in which the compositional equivalent of the material is a mud based on the analysis for the plurality of locations; Element B11: the method with Element B10 further including determining a cutting zone along the pipe for performing a cut and pull operation based the portion of the wellbore in which the compositional equivalent of the material is the mud; Element B12: the method with Element B10 further including cutting the pipe at the portion of the wellbore in which the compositional equivalent of the material is the mud, thereby producing a cut portion of the pipe; and pulling the cut portion of the pipe out of the wellbore; Element B13: wherein the pipe is a first pipe and a second pipe is disposed between the first pipe and the subterranean formation and the material is disposed between the second pipe and the subterranean formation; and Element B14: wherein the pipe is a first pipe and a second pipe is disposed between the first pipe and the subterranean formation and the material is disposed between the first and second pipes.

By way of non-limiting example, exemplary combinations applicable to Embodiment B include: two or more of Elements B1-B6 in combination; one or more of Elements B1-B6 in combination with one or more of Elements B7-B12; two or more of Elements B7-B12 in combination; Elements B13 or B14 in combination with any of the foregoing; and Elements B13 or B14 in combination with one or more of Elements B1-B12.

Embodiment C is a system that includes a conveyance extending into a wellbore penetrating a subterranean formation and coupled to a nuclear tool having at least one source and at least one detector, wherein the wellbore is lined with pipe and a material having an unknown composition is disposed between the pipe and the subterranean formation; and a control system that includes a non-transitory medium readable by a processor and storing instructions for execution by the processor for performing a method according to Embodiment A optionally with one or more of Elements A1-A18 or Embodiment B optionally with one or more of Elements B1-B14.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

For each of the three following examples, measurements were made in the lab with a nuclear tool, specifically, a HALLIBURTON SDLT-I nuclear density tool, having a near and far detector as illustrated in FIG. 2A. Two systems were assembled: (1) a two-piece casing having a single annulus disposed in a density formation block and (2) a three-piece casing having a double annulus disposed in a density formation block. The single annulus of System 1 or the double annulus of System 2 was filled with either air, water, or barite powder (as examples of gas, liquid, and mud compositional equivalents, respectively). The density tool was placed against the inner surface of the inner casings for each of Systems 1 and 2. The count rates were measured and corrected for background, streaming, dead-time, pulse-pile-up effect, and logging source variation. The corrected count rates were then analyzed as described in Examples 1 and 2.

Example 1

Figure 6:
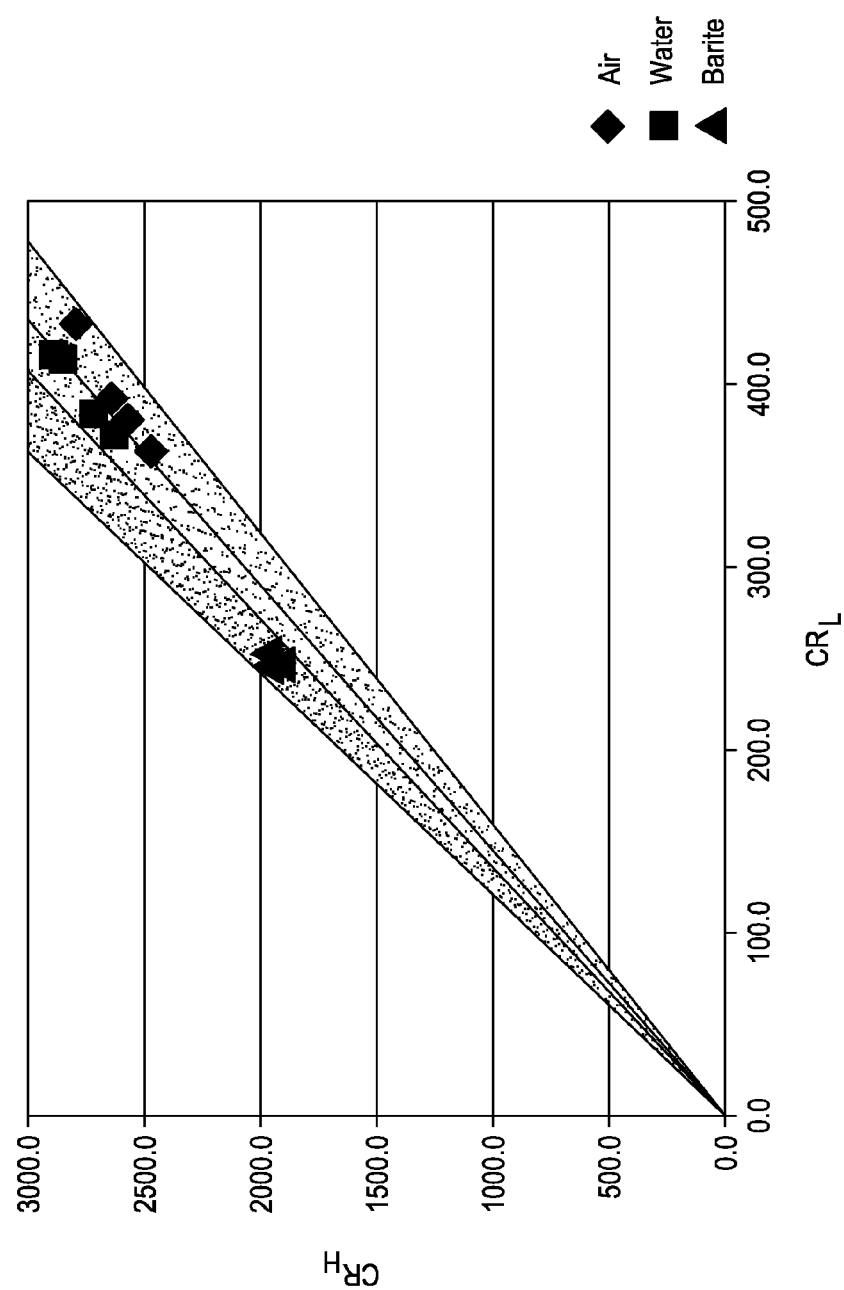
FIG. 6 illustrates a cross plot of the cumulative high-energy count rates versus the cumulative low-energy count rates for one detector.

A cross plot, FIG. 6, was prepared with the high-energy count rates for the near detectors versus the low-energy count rates for the near detectors. The plot illustrates that an analysis of the low and high-energy windows allows for distinguishing between compositional equivalents of gas, liquid, and mud. The plot further includes outlined areas corresponding to zones that may be used in determining the compositional equivalent of an unknown material.

Example 2

Figure 7:
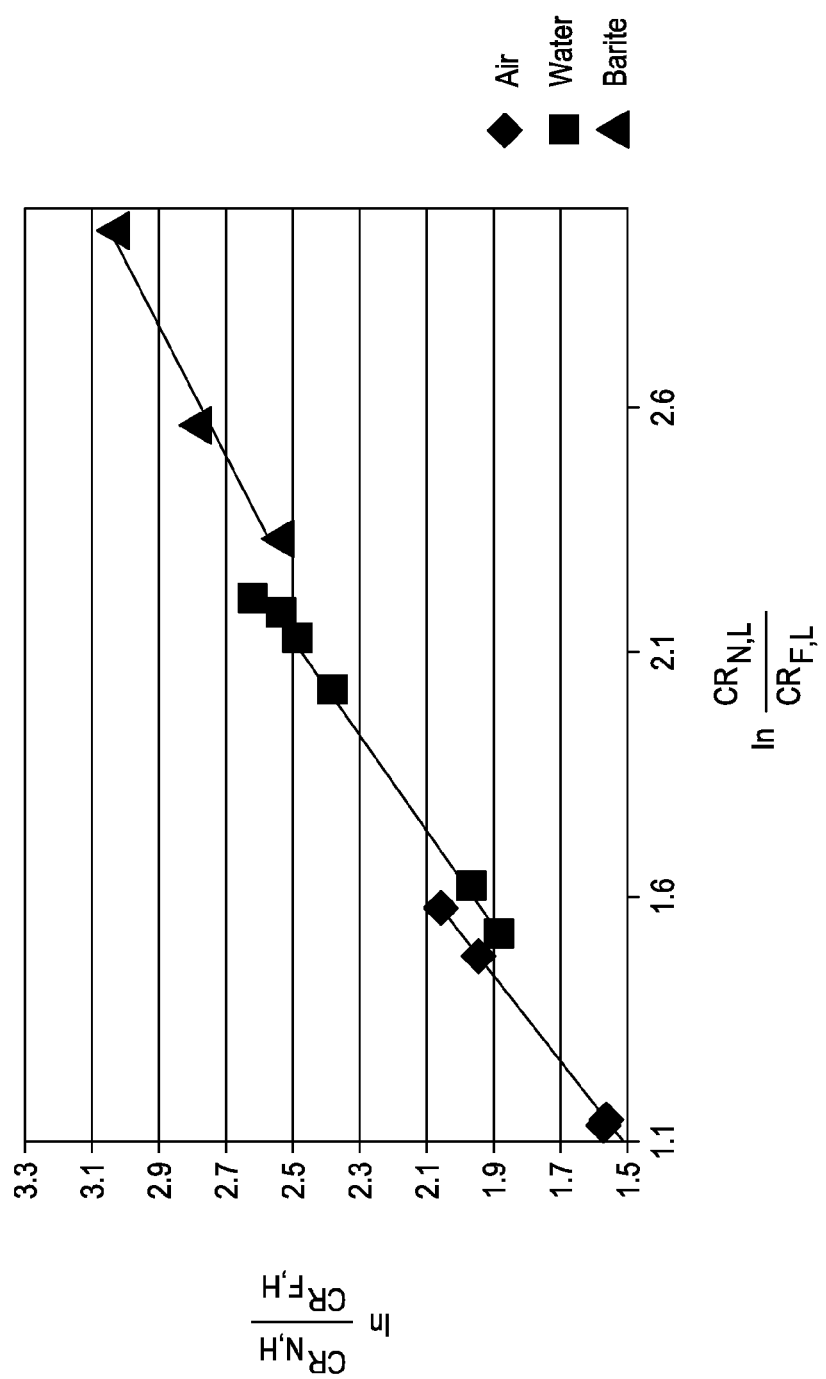
FIG. 7 illustrates a cross plot of $$\ln \frac{CR_N}{CR_F}$$

A cross plot, FIG. 7, was prepared with $$\ln\frac{CR_N}{CR_F}$$

(where $CR_F$ is the count rate for the far detector and $CR_N$ is the count rate for the near detector) of the high-energy range versus $$\ln\frac{CR_N}{CR_F}$$

of the low-energy count rates. Again, the plot illustrates that an analysis of the low and high-energy windows allows for distinguishing between compositional equivalents of gas, liquid, and mud. The plot further includes trend lines corresponding to zones that may be used in determining the compositional equivalent of an unknown material.

Example 3

The count rates were analyzed mathematically according to Equation 1 where $CR_{F-H}$ and $CR_{F-L}$ are the count rates for the far detector in the high and low-energy ranges, respectively, and $CR_{N-H}$ and $CR_{N-L}$ are the count rates for the near detector in the high and low-energy ranges, respectively. The results of Equation 1 for each material tested (air, water, and barite) are plotted in FIG. 8. Each composition has a ratio range corresponding thereto: air is about 1.3 to about 1.45, water is about 1.175 to about 1.225, and barite is about 1.05 to about 1.125. This example illustrates that a mathematical ratio may be used in determining the compositional equivalent of an unknown material.

$$\text{ratio} = \frac{\ln\frac{CR_{N,H}}{CR_{F,H}}}{\ln\frac{CR_{N,L}}{CR_{F,L}}} \quad \text{Equation 1}$$

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a wellbore penetrating a subterranean formation and lined with a pipe, wherein a material having an unknown composition is disposed between the pipe and the subterranean formation;
analyzing the material by:
emitting gamma rays into the pipe and the material from a source of a nuclear tool disposed in the wellbore;
detecting gamma radiation scattered back from the pipe and the material with each of a near gamma detector and a far gamma detector of the nuclear tool the near gamma detector being positioned between the source and the far gamma detector along a length of the nuclear tool;
determining, by a processor of a control system at least partially disposed within the nuclear tool, a high-energy range and a low-energy range for the gamma radiation detected by each of the near gamma detector and the far gamma detector;
determining, by the processor, count rates of the gamma radiation in the high-energy range ($CR_H$) and the low-energy range ($CR_L$) based on data collected by each of the near gamma detector and the far gamma detector;
and
determining, by the processor, a compositional equivalent for the material based on a comparison of the ($CR_H$) relative to the ($CR_L$) of each of the near gamma detector and the far gamma detector; and
inputting, by the processor, data relating to the compositional equivalent into a cutting device, the cutting device then performing a cut and pull operation at a position on the pipe based on the compositional equivalent data.

2. The method of claim 1, wherein the comparing comprises cross-plotting, by the processor, the $CR_H$ versus $CR_L$.

3. The method of claim 1, wherein the comparing comprises determining, by the processor, a $$\frac{CR_H}{CR_L},$$

a $$\frac{CR_L}{CR_H},$$

or both, and correlating the $$\frac{CR_H}{CR_L},$$

the $$\frac{CR_L}{CR_H},$$

or the both to the compositional equivalent for the material.

4. The method of claim 1, wherein the gamma radiation comprises a first gamma radiation detected by the near gamma detector and a second gamma radiation detected by the far gamma detector, the $CR_H$ is $CR_{N,H}$, and $CR_L$ is $CR_{N,L}$, and wherein determining the compositional equivalent further comprises:
  determining, by the processor, (1) the $CR_{N,H}$ and the second gamma radiation in the high-energy range ($CR_{F,H}$) relative to (2) the $CR_{N,L}$ and the second gamma radiation in the low-energy range ($CR_{F,L}$), wherein the
  compositional equivalent for the material is based on a comparison of the $CR_{N,H}$ and the $CR_{F,H}$ relative to the $CR_{N,L}$ and the $CR_{F,L}$.

5. The method of claim 4, wherein determining the compositional equivalent further comprises cross-plotting, by the processor, $$\frac{CR_{N,H}}{CR_{F,H}}$$

versus $$\frac{CR_{N,L}}{CR_{F,L}}.$$

6. The method of claim 4, wherein the determining the compositional equivalent further comprises determining, by the processor, a $$\frac{CR_{N,H}}{CR_{F,H}}$$

and a $$\frac{CR_{N,L}}{CR_{F,L}}$$

and correlating the $$\frac{CR_{N,H}}{CR_{F,H}}$$

and the $$\frac{CR_{N,L}}{CR_{F,L}}$$

to the compositional equivalent for the material.

7. The method of claim 4, wherein determining the compositional equivalent further comprises cross-plotting, by the processor, $$\ln\frac{CR_{N,H}}{CR_{F,H}}$$

versus $$\ln\frac{CR_{N,L}}{CR_{F,L}}.$$

8. The method of claim 4, wherein the determining the compositional equivalent comprises determining, by the processor, a $$\ln\frac{CR_{N,H}}{CR_{F,H}}$$

and a $$\ln\frac{CR_{N,L}}{CR_{F,L}}$$

and correlating the $$\ln\frac{CR_{N,H}}{CR_{F,H}}$$

and the $$\ln\frac{CR_{N,L}}{CR_{F,L}}$$

to the compositional equivalent for the material.

9. The method of claim 1 further comprising:
  moving the nuclear tool along the wellbore to a plurality of locations; and
  determining, by the processor, the compositional equivalent for the material for each of the plurality of locations.

10. The method of claim 9 further comprising:
comparing, by the processor, the determination corresponding to each of the plurality of locations.

11. The method of claim 9 further comprising:
identifying, by the processor, a portion of the wellbore in which the compositional equivalent of the material is a gas based on the analysis for the plurality of locations.

12. The method of claim 9 further comprising:
identifying, by the processor, a portion of the wellbore in which the compositional equivalent of the material is a liquid based on the analysis for the plurality of locations.

13. The method of claim 9 further comprising:
identifying, by the processor, a portion of the wellbore in which the compositional equivalent of the material is a mud based on the analysis for the plurality of locations.

14. The method of claim 13 further comprising:
determining, by the processor, a cutting zone along the pipe for performing the cut and pull operation based the portion of the wellbore in which the compositional equivalent of the material is the mud.

15. The method of claim 13 wherein the cut and pull operation comprises:
cutting the pipe at the portion of the wellbore in which the compositional equivalent of the material is the mud, thereby producing a cut portion of the pipe; and
pulling the cut portion of the pipe out of the wellbore.

16. A method comprising:
providing a wellbore penetrating a subterranean formation and lined with a pipe, wherein a material having an unknown composition is disposed between the pipe and the subterranean formation;
moving the nuclear tool along the wellbore to a plurality of locations, the nuclear tool having at least one source and at least two detectors; and
analyzing the material at the plurality of locations by:
emitting gamma rays into the pipe and the material from a first source of a nuclear tool disposed in the wellbore;
detecting first gamma radiation scattered back from the pipe and the material with a near detector of the nuclear tool;
detecting second gamma radiation scattered back from the pipe and the material with a far detector of the nuclear tool, wherein the first source, the near detector, and the far detector are positioned sequentially along a length of the nuclear tool such that the near detector is between the first source and the far detector;
determining, by a processor of a control system at least partially disposed within the nuclear tool, a high-energy range and a low-energy range for the first and second gamma radiation;
determining, by the processor, count rates of the first gamma radiation in the high-energy range ($CR_{N,H}$) and the low-energy range ($CR_{N,L}$) and count rates of the second gamma radiation in the high-energy range ($CR_{F,H}$) and the low-energy range ($CR_{F,L}$); and
determining, by the processor, a compositional equivalent for the material at each of the plurality of locations based on a comparison of (1) the $CR_{N,H}$ and the $CR_{F,H}$ relative to (2) the $CR_{N,L}$ and the $CR_{F,L}$ of the near and far detectors; and
inputting, by the processor, data relating to each compositional equivalent into a cutting device, the cutting device then performing a cut and pull operation at each position on the pipe based on the compositional equivalent data.

17. The method of claim 16 further comprising:
determining a cutting zone along the pipe for performing a cut and pull operation based the compositional equivalent for the material at each of the plurality of locations.

18. The method of claim 16, wherein the comparison of the $CR_{N,H}$ and the $CR_{F,H}$ relative to the $CR_{N,L}$ and the $CR_{F,L}$ involves: cross plotting and displaying, by the processor, $$\frac{CR_{N,H}}{CR_{F,H}}$$

versus $$\frac{CR_{N,L}}{CR_{F,L}}.$$

19. The method of claim 16, wherein the comparison of the $CR_{N,H}$ and the $CR_{F,H}$ relative to the $CR_{N,L}$ and the $CR_{F,L}$ involves: determining, by the processor, a $$\frac{CR_{N,H}}{CR_{F,H}}$$

and a $$\frac{CR_{N,L}}{CR_{F,L}}$$

and correlating the $$\frac{CR_{N,H}}{CR_{F,H}}$$

and the $$\frac{CR_{N,L}}{CR_{F,L}}$$

to the compositional equivalent for the material.

20. The method of claim 16, wherein performing the analysis comparison of the $CR_{N,H}$ and the $CR_{F,H}$ relative to the $CR_{N,L}$ and the $CR_{F,L}$ involves: cross plotting and displaying, by the processor, $$\ln\frac{CR_{N,H}}{CR_{F,H}}$$

versus $$\ln\frac{CR_{N,L}}{CR_{F,L}}.$$

21. The method of claim 16, wherein the comparison of the $CR_{N,H}$ and the $CR_{F,H}$ relative to the $CR_{N,L}$ and the $CR_{F,L}$ involves: determining, by the processor, a $$\ln\frac{CR_{N,H}}{CR_{F,H}}$$

and a $$\ln\frac{CR_{N,H}}{CR_{F,H}}$$

and correlating the $$\ln\frac{CR_{N,H}}{CR_{F,H}}$$

and $$\ln\frac{CR_{N,H}}{CR_{F,H}}$$

to the compositional equivalent for the material.

22. A system comprising:
a conveyance extending into a wellbore penetrating a subterranean formation and coupled to a nuclear tool having at least one source a first detector, and a second detector, wherein the wellbore is lined with pipe and a material having an unknown composition is disposed between the pipe and the subterranean formation, and the first detector is positioned between the source and the second detector along a length of the nuclear tool; and a control system that includes a non-transitory medium readable by a processor and storing instructions for execution by the processor for performing a method, the method comprising:

emitting gamma rays into the pipe and the material from a first source of a nuclear tool disposed in the wellbore;

detecting gamma radiation scattered back from the pipe and the material with the first detector and the second detector of the nuclear tool;

determining, by the processor, a high-energy range and a low-energy range for the gamma radiation detected by each of the first and second detectors;

determining, by the processor, count rates of the gamma radiation in the high-energy range ($CR_H$) and the low-energy range ($CR_L$) based on data collected by each of the first and second detectors;

determining, by the processor, a compositional equivalent for the material based on a comparison of the $CR_H$ relative to the $CR_L$ for the first and second detectors; and inputting, by the processor, data relating to each compositional equivalent into a cutting device, the cutting device then performing a cut and pull operation at each position on the pipe based on the compositional equivalent data.

* * * * *

UNITED STATES PATENT AND TRADEMARK OFFICE
CERTIFICATE OF CORRECTION

PATENT NO. : 9,951,614 B2  
APPLICATION NO. : 15/111634  
DATED : April 24, 2018  
INVENTOR(S) : Yike Hu et al.

Page 1 of 1

It is certified that error appears in the above-identified patent and that said Letters Patent is hereby corrected as shown below:

In the Claims

Column 22, Line 50, Claim 20, Line 1, please delete "performing"; and  
Column 22, Line 51, Claim 20, Line 2, please delete "analysis".

Signed and Sealed this  
Third Day of July, 2018

Andrei Iancu  
*Director of the United States Patent and Trademark Office*